(No Model.) 7 Sheets—Sheet 1.
G. W. PASSEL & J. SOFGE.
MORTISING MACHINE.

No. 457,368. Patented Aug. 11, 1891.

Fig. 1

Witnesses:
W. C. Jirdinston.
W. J. Walker

Inventors
George W. Passel & John Sofge
Attorney.

(No Model.) 7 Sheets—Sheet 5.

G. W. PASSEL & J. SOFGE.
MORTISING MACHINE.

No. 457,368. Patented Aug. 11, 1891.

Witnesses:
Henry Appleton
W. J. Walker

Inventors
George W. Passel & John Sofge

Attorney.

(No Model.) 7 Sheets—Sheet 7.

G. W. PASSEL & J. SOFGE.
MORTISING MACHINE.

No. 457,368. Patented Aug. 11, 1891.

Witnesses
Henry Appleton
Wm. J. Walker

Inventors
George W. Passel & John Sofge
Attorney

UNITED STATES PATENT OFFICE.

GEORGE W. PASSEL AND JOHN SOFGE, OF CINCINNATI, OHIO, ASSIGNORS TO J. A. FAY & COMPANY, OF SAME PLACE.

MORTISING-MACHINE.

SPECIFICATION forming part of Letters Patent No. 457,368, dated August 11, 1891.

Application filed April 15, 1890. Serial No. 347,963. (No model.)

*To all whom it may concern:*

Be it known that we, GEORGE W. PASSEL and JOHN SOFGE, citizens of the United States, residing at Cincinnati, Ohio, have invented new and useful Improvements in Mortising-Machines, of which the following is a specification.

Our invention relates to mortising - machines of the class of power-machines in which a tool-carriage carrying a rotating "hollow auger" or combined chisel and auger is driven reciprocally to and from the work secured upon a platen or table; and it consists in the improved machine embodying various detailed improvements in construction and arrangement of its parts and the operative mechanism, all as hereinafter more fully set forth.

Mechanism embodying our invention is illustrated in the accompanying drawings, in which—

The machine constructed according to our improvements consists, in the main, of a supporting table-frame, at one end of which is attached a vertical column extending above the highest point of adjustment of the tool-carriage, on which the counterbalanced tool-carriage is carried in vertical guides, and at the other end a work-table upon which a platen is adjustably mounted upon horizontal guides adjustable in the plane of chisel action coincidently with and transversely across the line of thrust. The hollow chisel is carried, with an auger in constant rotation, in a "ram" reciprocated longitudinally to and from the work secured upon the platen.

Referring now more particularly to the drawings, A designates the table-frame, and B the column upon which the tool-carriage is mounted. The column is rigidly based upon the general base of the entire machine, and is made wide and strong in the plane of chisel action to assist the powerful thrust required in the action of the machine. The tool-carriage consists of a slide-plate B', held by gibs B⁷ in a vertical sliding connection upon the front edges of the column B, and carries the ram B², held by gibs B⁶ in a horizontal sliding connection upon the plate B' between projecting guide-flanges of the latter. The chisel-ram B² is an open rectangular slide-frame having journal-bearings upon its vertical shorter sides or ends, in which the boring-spindle B⁵ is horizontally journaled, the spindle carrying an elongated belt-pulley A⁵ (shown in dotted lines in Figs. 1 and 4) centrally between the bearings. The ram projects at one end into a chisel-holder B⁴, carrying a "hollow chisel-auger" B³ of the usual form, the end of the auger socketing in the end of the boring-spindle, while its punching-chisel is clasped firmly in the chisel-holder B⁴. The plate B' carries a depending rack-bar C⁶, (guided in a bracket D', Fig. 3,) by which the tool-carriage may be elevated or depressed at will to adjust the chisel vertically to the work by connection with a spur-pinion C⁷, Fig. 1, upon a cross-shaft C⁸, which is journaled in brackets C⁹ C¹⁰, Fig. 2, of the column B, and actuated by an external hand-wheel D.

Figure 2:
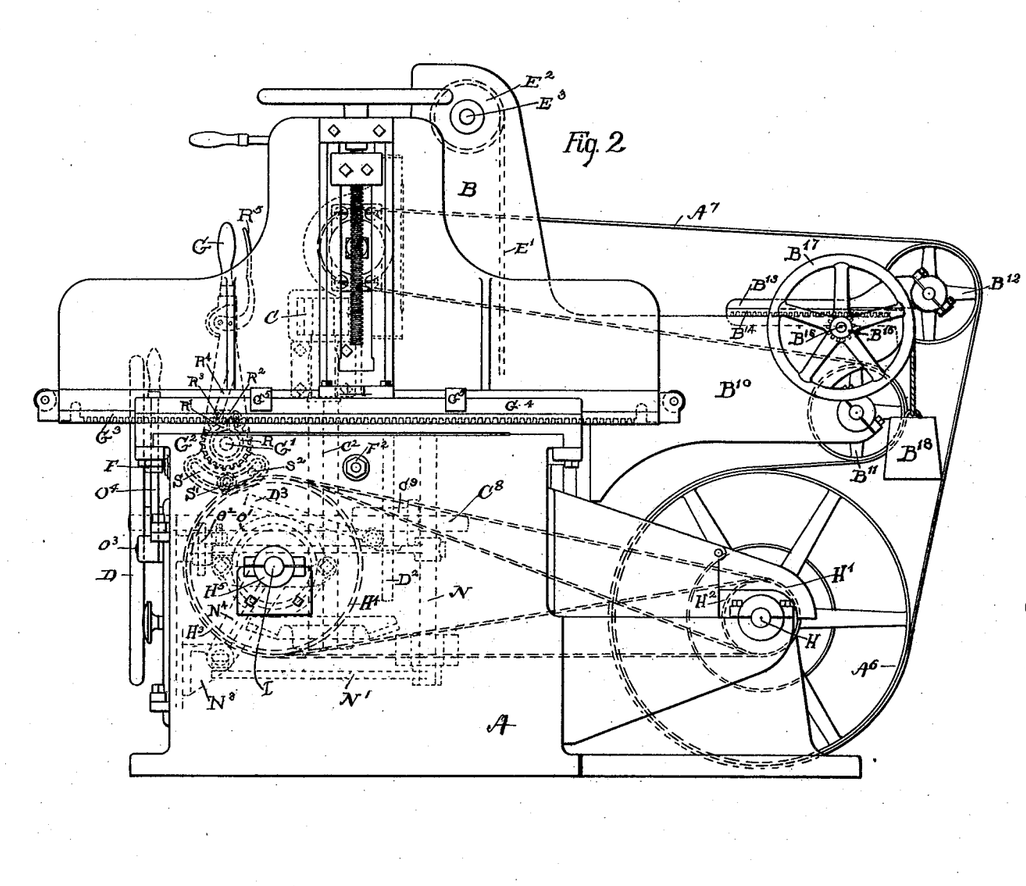
Fig. 2, an end elevation from the platen end complete.
Figures 5, 6, 7, 8, 9, 10:
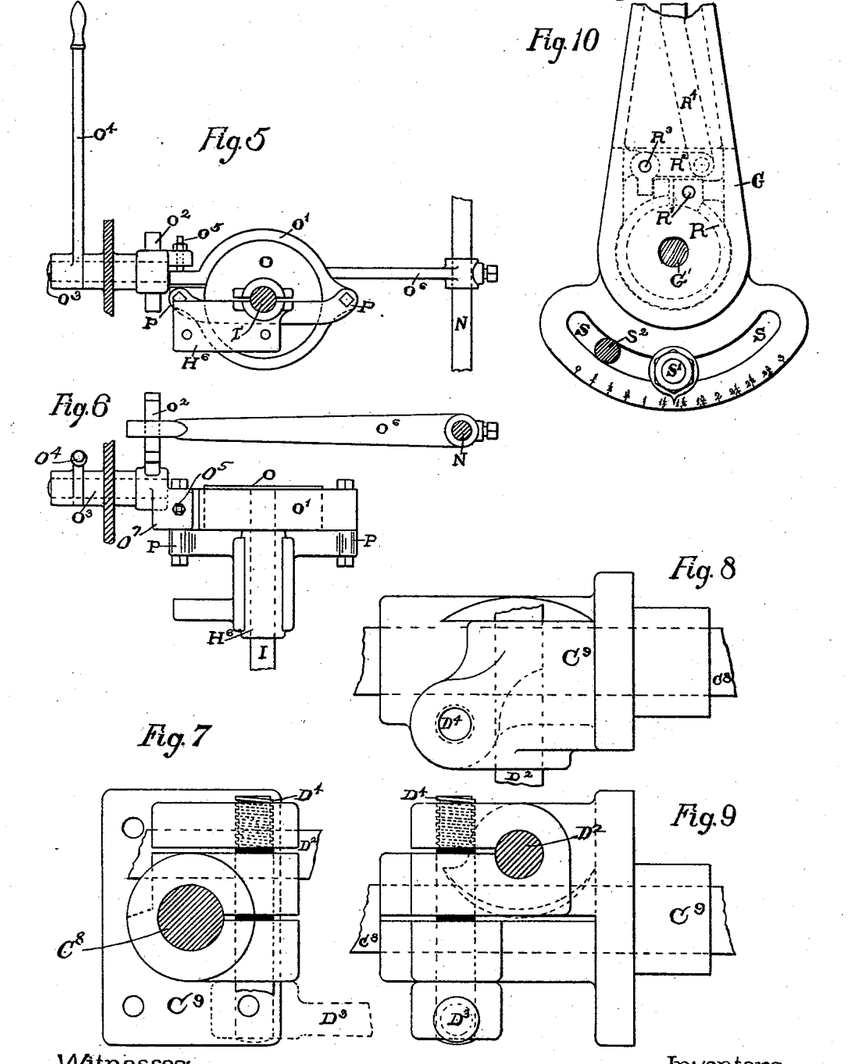
Figs. 5 and 6 are details of the brake mechanism of the ram-driving shaft.
Figs. 7, 8, and 9 are detail views of the split locking-bearing for the tool-carriage-elevating shaft.
Fig. 10 is an enlarged view of the platen-feed lever.

To lock the tool-carriage firmly at any given elevation, the bearing C⁹ (shown in detail in Figs. 7, 8, and 9) of the shaft C⁸ is provided with a vertical aperture, in which is guided a vertical rod D², depending from the plate B', Fig. 2. The bearing-block C⁹ is "split"

in parallel planes as to both its apertures and provided with a clamping-screw $D^4$, actuated by a hand-lever $D^3$, lying in convenient proximity to the hand-wheel D. The tool-carriage is counterbalanced by a weight E within the column B, connected by wire ropes or chains $E'$, passing over sheaves $E^2$, pivoted to and between the upper side walls of the column B and attached to the plate $B'$.

Figure 1:
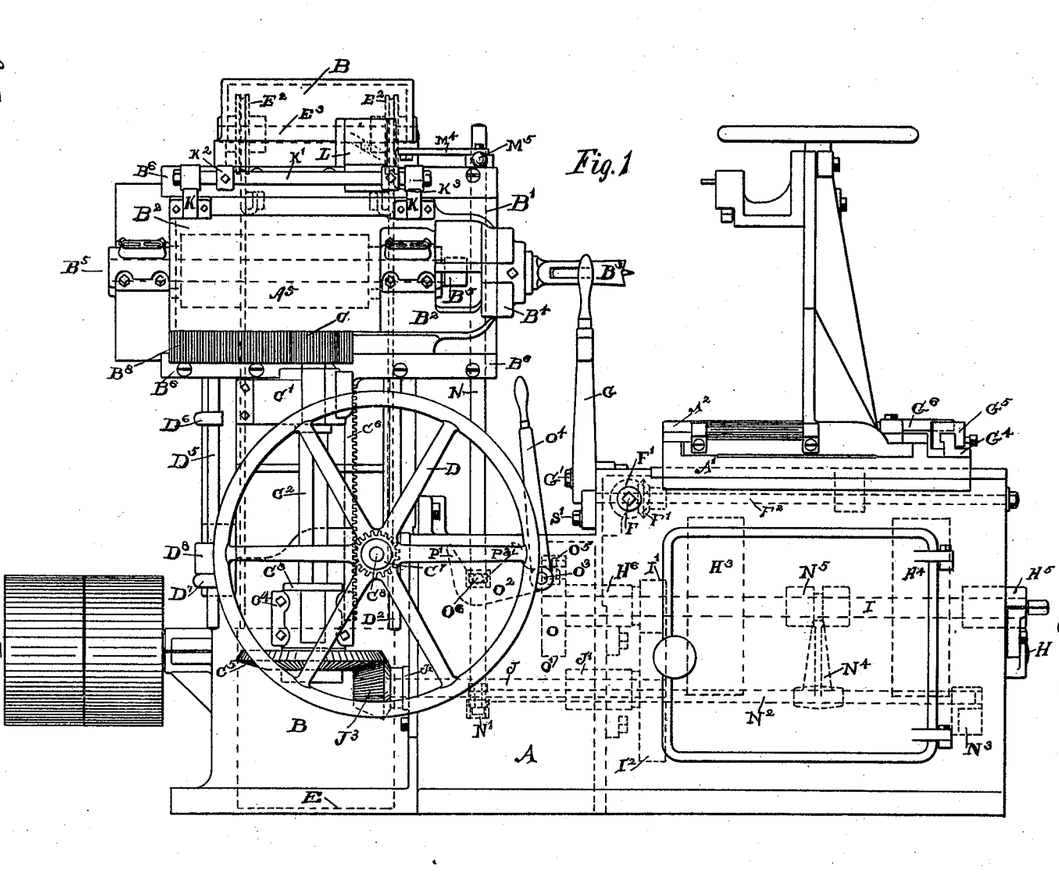
Figure 1 is a side elevation complete.
Figure 3:
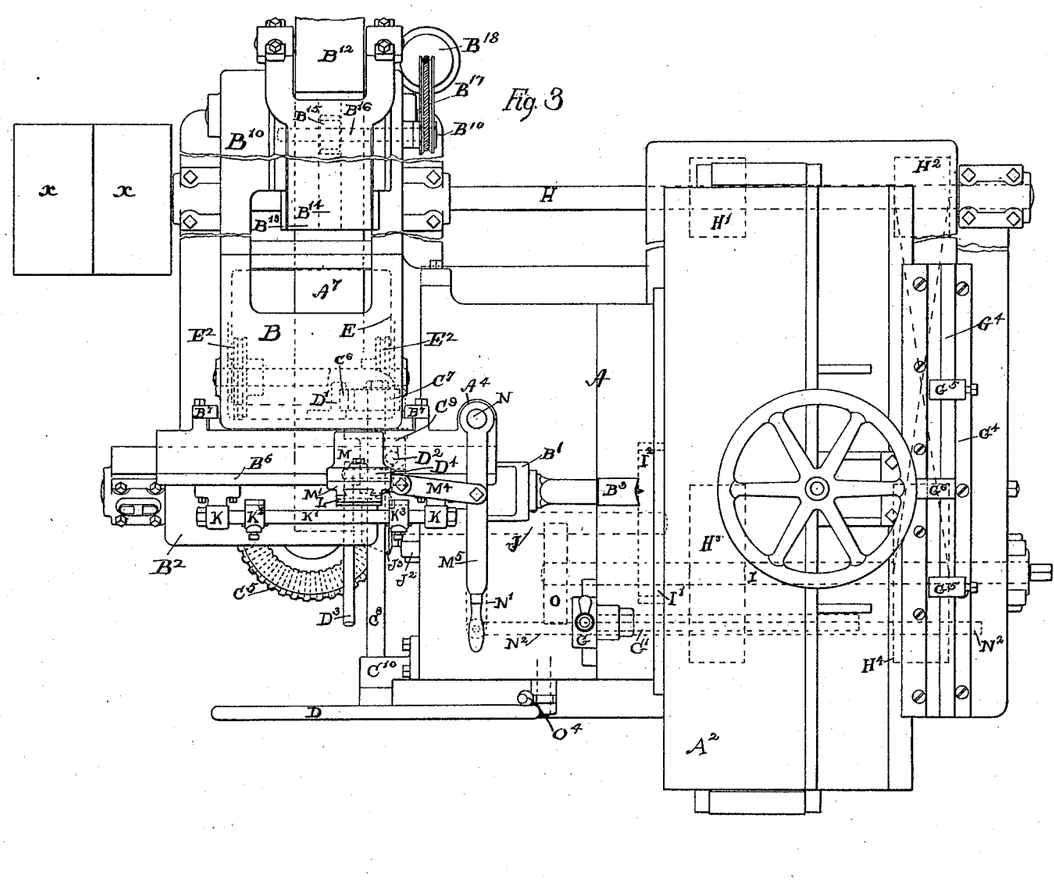
Fig. 3, a plan view.
Figure 4:
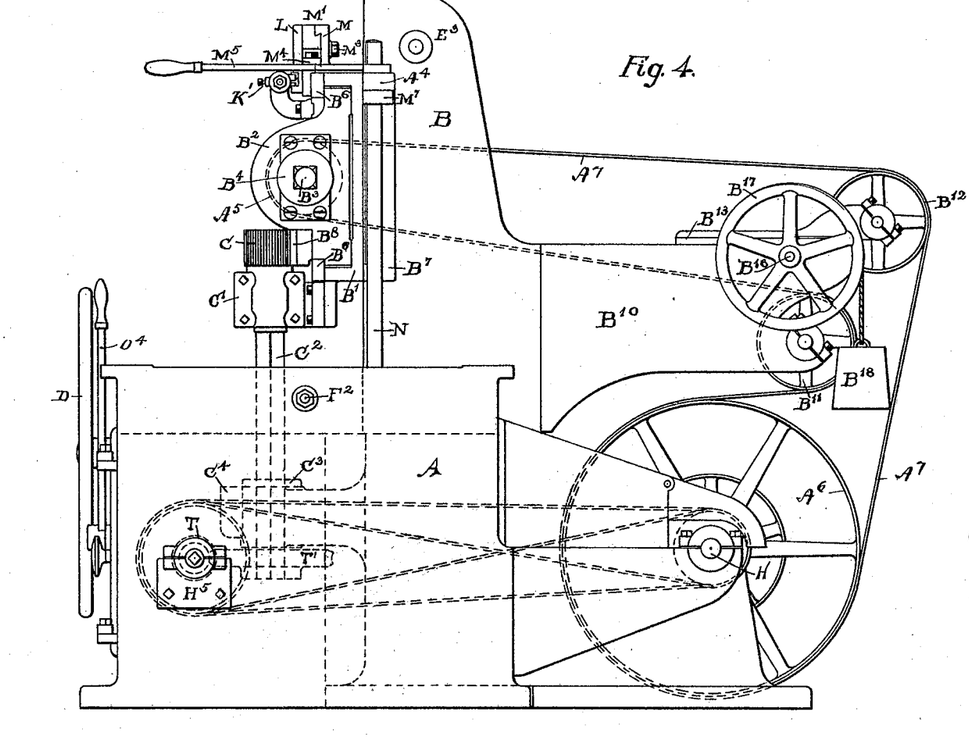
Fig. 4, an end elevation similar to Fig. 2, but omitting the work-table or platen. This figure also exhibits a modification, substituting a worm-gear for the bevel-gears in the reciprocating mechanism of the chisel-ram.

The chisel-ram $B^2$ is provided at its lower portion with a horizontal rack-plate $B^8$, Figs. 1 and 4, by which it is moved horizontally to and from the work by an intermeshing pinion journaled and held vertically in a bracket-bearing $C'$, depending from the plate $B'$. Below the bearing $C'$ the shaft $C^2$ is squared and passed through an interiorly-squared journal-sleeve $C^3$, constituting the projecting hub of a bevel-pinion $C^5$, the hub $C^3$ being journaled and held vertically in a bracket-bearing $C^4$ at the lower part of the column. The vertically-sliding connection of the squared shaft with the pinion $C^5$ permits the shaft $C^2$ to move vertically while retaining its rotating connection with the pinion $C^5$, and also retains the spur-pinion C in engagement with the rack-plate $B^8$. Power is communicated to the bevel-pinion $C^5$ (to reciprocate the chisel-ram) and to the spindle-pulley $A^5$ (to rotate the auger) from a common source—to wit, a main-feed counter-shaft H, Figs. 2 and 3, suitably journaled across and through the rear of the main frame A and column B—the initial fast and loose driven pulleys $x$ $x$ being located, preferably, at the projecting end of the shaft beyond and outside of the column and receiving power in the usual manner.

For the rotation of the boring-spindle there is arranged upon the counter-shaft H, between the sides of the column B in line with the spindle-pulley $A^5$, a belt-pulley $A^6$, Figs. 3 and 4. Its belt $A^7$ passes from the forward side of the pulley $A^6$ rearwardly around a fixed guide-pulley $B^{11}$, journaled in and between brackets $B^{10}$, projecting rearwardly from the column B, thence forward between the side walls of the column B through an opening in the plate $B'$ and around and over the boring-spindle pulley $A^5$, thence rearwardly in a bight around an adjustable idler-pulley $B^{12}$, and downwardly around the driving-pulley $A^6$. The pulley $B^{12}$ is carried upon a sliding frame $B^{13}$, gibbed to slide horizontally upon the upper edges of the projecting brackets $B^{10}$. Journaled through the brackets $B^{10}$, beneath the sliding frame $B^{13}$, is a short transverse shaft $B^{16}$, carrying between the brackets a spur-pinion $B^{15}$, engaging a rack-plate at the under side of the frame $B^{13}$. The shaft $B^{16}$ is actuated by an external grooved pulley $B^{17}$, provided with a cord and attached weight $B^{18}$. The weight $B^{18}$ thus acts through the pinion $B^{15}$ and rack-plate to impel the idler $B^{12}$ outward as a belt-tightener and accommodates the rise and fall of the chisel-ram $B^2$.

For the reciprocation of the chisel-ram the following mechanism is provided: Upon the counter-shaft H within the table-frame A are two additional belt-pulleys $H'$ $H^2$, having direct and crossed belt connections, respectively, with the corresponding pulleys $H^3$ $H^4$, Figs. 1, 2, 3, and 4, loose upon a shaft I, carried parallel with shaft H in the forward part of the table-frame A. Each of the pulleys $H'$ $H^2$ has a friction device, Figs. 14 and 15, hereinafter described, the two being actuated alternately by a cam-collar $N^5$, Fig. 1, from a central position of disengagement with either to engage the belt-pulleys $H^3$ $H^4$ alternately, and thus reciprocate the chisel-ram in opposite directions as one or the other of the clutch-pulleys is engaged with the shaft I. The transmitting connections, Figs. 1 and 3, are a spur-pinion $I'$ on shaft I, an intermeshing spur-gear $I^2$ upon a parallel counter-shaft J, (in bearings $J'$ $J^2$ of the frame A,) and a bevel-pinion $J^3$ on the shaft J, intermeshing with the bevel-wheel $C^5$, before described. The cam-collar $N^5$ is actuated ultimately from the ram itself by an arm $N^4$, carried upon a shifting-rod $N^2$. The latter is carried in sliding bearings below and parallel with the shaft I and reciprocated by a direct connection with a crank $N'$, Figs. 1, 2, and 3, on a vertical rock-shaft N, having a lower bearing on the frame A and extending to the upper limit of the chisel-carriage movement at the side of the column B in rear of the plate $B'$, with which it has a sliding loop connection $A^4$. The loop-bracket $A^4$ embraces the sleeve or hub $M^7$ of the crank-arm $M^5$, extended forward as a hand-lever at the top of the chisel carriage or plate $B'$. The crank-hub having a split connection with the rock-shaft N, permits it to rise and fall upon the shaft N with the vertical movements of the plate $B'$, but retain its rotating connection.

Figures 11, 12, 13, 14, 15:
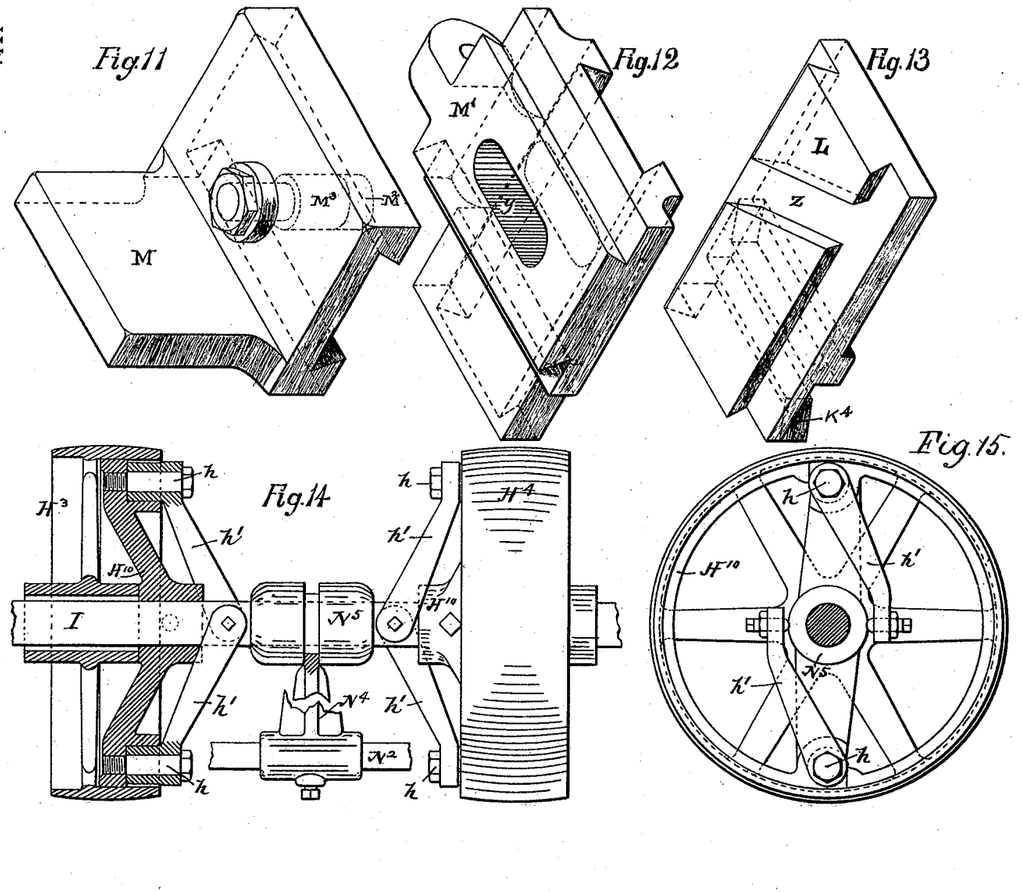
Figs. 11, 12, and 13 are perspective views of the several parts of the automatic reversing device of the tool-carriage.
Fig. 14 is a side elevation, part section, of the clutch-pulley and the intervening engaging mechanism.
Fig. 15 is a face elevation of one of the clutch-pulleys.
Figure 16:
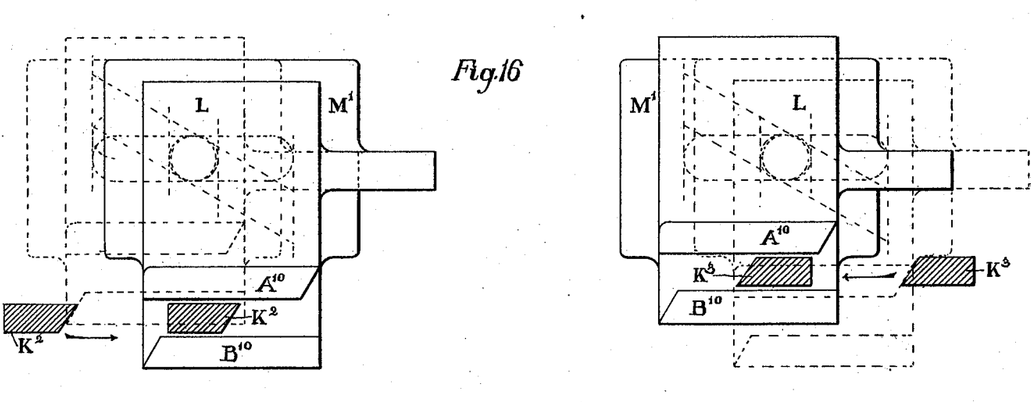
Fig. 16 is a detail of the movable plates of the tool-carriage-reversing device, showing the direction and amount of movement when acted upon by the reversing-stops.
Figure 17:
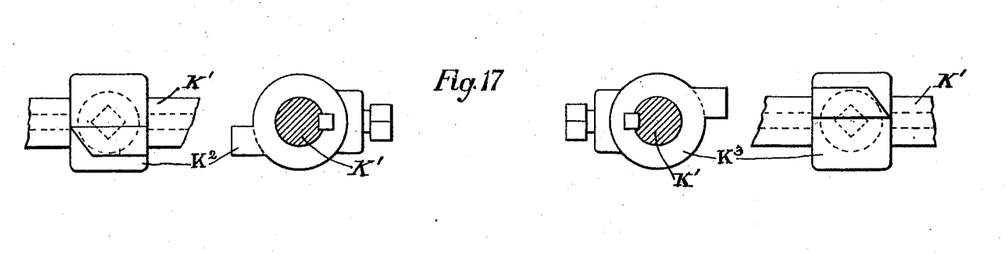
Fig. 17 is a detail of the tool-carriage-reversing stops.

The crank-lever $M^5$ is connected midway by a link $M^4$ with the central member $M'$ of a stop device of the following construction, (see Figs. 1, 3, and 4 and detail Figs. 11, 12, and 13:) A flanged bracket M, attached to the upper side of the plate $B'$, carries a plate $M'$, dovetailed in its face to slide horizontally, and the plate $M'$ carries in turn at its forward face a plate L, dovetailed in the same to slide vertically. A pin or stud $M^3$, set in the bracket M, projects forward through a horizontal slot $y$ in the central plate $M'$ and into an inclined recess or slotway $z$ in the rear dovetailed projection of the outer plate L, in which latter slot the pin carries a friction-roll $M^2$. The outer face of the plate L is in the plane of two stops $K^2$ $K^3$, Figs. 1, 3, and 17, adjustably set upon a rod $K'$ held in brackets K K upon the front face of the chisel-ram $B^2$ and reciprocating with it. The object and effect of this arrangement, as will be more fully explained later, are to render the control of the shifting cam-collar $N^5$ automatic in shifting from direct to reverse motion. This automatic reversal takes place only at the close of the chisel-ram movement in either direction, according to the adjusted position of the stops K' K²; but as the speed of the machine is considerable its momentum is especially provided for by mechanism as follows: It will be seen from the construction and arrangement of the plates L M M' that when the plate L is arrested by the stops K² K³ the action of the pin M³ of the bracket-plate M in the slots $y$ and $z$ permits the central plate M', which rotates the shaft N, to move forward with the ram only so far as the plate L can move downward or upward, as the case may be. The engaging portion of the plate L is formed of two horizontal bars or projections $A^{10}$ $B^{10}$ upon the forward face of the plate, leaving a horizontal recess between. The form of parts and relation to the cam-stops K² K³ are shown in Fig. 16, in which the ultimate positions of the plate L, in relation to the stops K² K³, are shown in full lines and their preliminary engaging positions adjoining in dotted lines, the arrows respectively differentiating the positions and direction of engagement. Referring to the left-hand position shown, it will be seen that the preliminary engagement takes place by the stop K² coming upon the beveled end of the bar or projection $B^{10}$, and as the movement continues the plate L descends until the bar $A^{10}$ strikes the stop, preventing further vertical movement, but allowing the horizontal movement to continue, the stop traveling relatively in the horizontal recess between the bars $A^{10}$ $B^{10}$ so far as the momentum of the machine may continue the forward motion of the ram. The stops K² K³ occupy different planes, and the action of one in elevating the plate L is similar to that of the other in depressing it in reverse.

The pulleys $H^3$ $H^4$ and their actuating mechanism are constructed as shown in detail, Figs. 14 and 15. The pulleys both run loose upon the shaft and each is adjoined by an inner loose friction-pulley $H^{10}$, keyed to the shaft by its hub and lying within the inner periphery of the loose pulley. At diametrically-opposite points upon studs $h$ $h$ are pivoted wedging-levers $h'$ $h'$, projecting inwardly with their inner terminals lying adjacent to the shaft and their outer terminals interposed as cam-blocks in the blank spaces or cuts in the periphery of the split-pulley rim. The inner terminals of the levers $h'$ lie at opposite sides of the shaft in the longitudinal path of the cam-block $N^5$, by the movement of which toward either of the pulleys its levers $h'$ are forced outward by the wedging action of the cam-terminals and the rim of the split pulley spread outward to engage the inner periphery of the belt-pulley and engage it with the shaft I. When the cam-block $N^5$ occupies the central position, engaging neither of the friction-pulleys, the belt-pulleys $H^3$ $H^4$ run loose without actuating the shaft I.

The reversal of the machine may be effected at any time by the hand-lever $M^5$ or its motion absolutely arrested by the means to be now described.

A brake is attached to the shaft I, by which the feed motion may be arrested at any time, the construction being as follows, Figs. 5 and 6: A smooth-faced brake-wheel O is secured to the shaft I, having a split friction-ring O' surrounding its periphery and held upon lug projections $p$ $p$ of the bearing $H^6$. A forked or V-shaped cam $O^2$ (shown in side view in Fig. 1) is pivoted upon a stud $O^3$ in such relation that upon being rotated by an operating hand-lever $O^4$ a rear projecting lug $O^7$ bears upon the free end of the split ring O' and closes it down upon the wheel O, as a brake. The forked cam $O^2$ is formed with a V-shaped recess at its upper side, giving oppositely-inclined engaging surfaces $p'$ $p^2$, tending toward a common center at their junction to engage (by the same throw that operates the brake) a horizontal crank-arm $O^6$ upon the rod N, so that the jaws $p'$ $p^2$ of the cam shall engage the crank $o^6$ and rotate the rod from either position until the arm rides to the bottom of the V-shaped recess, thus bringing the rod N to its central position and shifting the cam-block $N^5$ to its central or disengaged position from either direction. For the purpose of adjusting the pressure of the brake at the central position of the cam-block $N^5$ a set-screw $O^5$ is threaded through the rear projection $O^7$ of the forked cam as an adjustable abutment or bearing against the end of the brake-ring. In the drawings the brake is shown in applied position. When the lever $O^4$ is released, the cam-arm $O^2$ drops down and the brake is at the same time released. The parts are so adjusted that the "pick-up cam" $O^2$ will engage the lever $O^6$ from any position in which the latter may be and bring it instantly to its central position, in which the driving-power is wholly suspended, and at the same time brake the momentum of the machine by drawing down the ring-brake O' upon the brake-wheel O.

In the modification shown in Fig. 4 we use the clutch-pulleys $H^3$ $H^4$, of somewhat reduced diameter, and dispense with the extra counter-shaft J and its bearings J' $J^2$. In lieu of the bevel-gears $J^3$ and $C^5$, we place a worm T upon the shaft I, engaging a worm-wheel T' upon the sleeve $C^3$ and thus actuating the vertical shaft $C^2$.

The work-table and its mechanism are constructed as follows: A lower slide-plate A' is gibbed to slide toward and from the column B upon the table-frame A. The required motion is given by a wrench or socket-lever applied to the squared end of a projecting shaft F, having a bevel-gear connection F' F', with a screw-shaft $F^2$, engaging through a lug on the lower side of slide-plate A'. Upon the slide-plate A' is a platen $A^2$, gibbed to the slide transversely and actuated by a hand-lever G, Fig. 2, shaft G', pinion $G^2$, and a rack-bar $G^3$. The shaft G' has its bearing on the frame A, and is splined for its rack-pinion $G^2$, while the rack is bolted to the platen A², the connection being through a central opening of the plate A'. The hand-lever G for moving the platen A² is provided with a lower extension, (see Fig. 10,) having a concentric arc slot S therein to receive an adjustable forward stop or indicator-bolt S' to regulate the length of throw in order to adjust and limit the movement of the platen to different widths of chisels. A stationary pin S² is also provided in the table-frame and entering the slot as a back-stop for the lever. The lever G is loose upon its shaft G', but engages it by a split friction-ring clutch R, surrounding an enlargement or collar upon the shaft, having one of its two terminals secured to the side of the lever at R and the other engaged by a small bell-crank R², also pivoted to the lever at R³ and operated by a link R⁴, engaging a supplemental bell-crank handle R⁵, also pivoted to the lever. Upon compressing the two handles together the friction-ring engages the lever G to its shaft G'.

For gaging the length of mortises adjusting stops G⁵ G⁵, Figs. 1, 2, and 3, are provided upon a rod or bar G⁴, and an arm G⁶, projecting into the path of the stops from the platen A². The platen is provided with a suitable backing abutment with devices for adjusting and securing the sill or thin piece to be mortised, in the usual or ordinary suitable manner.

The operation of the machine has been to a great extent indicated in the preceding description of its parts, but may be recapitulated as follows: The driving motion is continuous, the pulleys H³ H⁴ being in operation in different directions. The shifting of the cam N⁵ to one side or the other connects the shaft I with one or the other pulley and gives it a corresponding direction of motion, which is communicated through the shaft I, gears I' I², shaft J, pinion J³, and bevel-gear C⁵ to shaft C² and pinion C by means of rack B³ to the ram B², thus reciprocating the chisel B³.

It will be seen from the construction and relation of parts that resisting strains occasioned by the thrust of the chisel-ram are taken wholly and directly by the column, the base-line of resistance extending at right angles to and equally on both sides of the line of thrust in any position of the tool-carriage. The reversal of the movement is made automatic by the reversing device L, (and its connected parts,) operating the rock-shaft N, (through link M⁴ and crank M⁵,) which, by its lower crank N', operates the shifter-rod N² and shifter-arm N⁴, engaging the cam N⁵. The crank M⁵ being extended into a hand-lever, the reversal may be effected at any intermediate point. The motion of the ram may be arrested permanently at any point by the hand-lever O⁴ operating the pick-up cam O², engaging an intermediate crank o⁶ of rock-shaft N, drawing the rock-shaft N (and the cam N⁵) to a central position, at the same time applying a friction-brake to the shaft I. The chisel-ram is adjusted vertically by a hand-wheel D, operating a pinion C⁷, engaging a rack-bar C⁶, depending from the plate B', and is locked by a hand-lever D³, operating a screw-bolt inserted through the split bearing of the hand-wheel shaft, and closing also a loop in the same bearing surrounding a rod D², depending from the plate B'. The platen is operated across the line of chisel-thrust by the hand-lever G in increments of movement determined by the position of the indicator-bolt S' in the slotway of the lever, the throw of the lever operating a pinion engaging a rack upon the platen. The table or plate upon which the platen is mounted is adjustable upon the supporting-frame in the line of the chisel thrust by a screw-shaft F².

We claim as our invention and desire to secure by Letters Patent of the United States—

1. In a horizontal mortising-machine, the combination of a supporting-bed, a horizontally-adjustable work-platen, a supporting-column extending above and below the limits of tool-carriage adjustment, having a guide-face approximately in the common plane of chisel-and-auger action, a vertical supporting-plate vertically adjustable upon the guide-face of said column, a second vertical plate carried in horizontal guides upon the outer face of the supporting-plate, provided with mechanism for its automatic reciprocation in said guides, and a rotating tool-shaft horizontally journaled upon said second plate and provided with an elongated driving-pulley, substantially as set forth.

2. In a horizontal mortising-machine, the combination of a supporting-bed, a horizontally-adjustable work-platen, a perforated supporting-column extending above and below the limits of tool-carriage adjustment, having a guide-face approximately in the plane of chisel and auger action, a perforated vertical supporting-plate vertically adjustable upon the guide-face of said column, a second perforated vertical plate carried in horizontal guides upon the outer face of the supporting-plate, provided with mechanism for its automatic reciprocation in said guides, a rotating tool-shaft horizontally journaled upon said second plate and provided with an elongated driving-pulley, and driving-belt connections extending from said pulley outward through said chisel-ram, supporting-plate, and guide-column, substantially as set forth.

3. In a horizontal mortising-machine, the combination of a vertical guide-column having its guide-face parallel with the plane of chisel-thrust, a vertically-adjustable supporting-plate held and guided thereon in a corresponding plane, a horizontally-reciprocable chisel-ram held and guided upon said supporting-plate and provided with a horizontal rack, a pinion in mesh with said rack fixedly journaled upon said supporting-plate, a shaft fixed to said pinion and extended downward, and a horizontal reversible driving-wheel journaled in the base of the machine, with which the pinion-shaft is extensibly connected in constant rotative engagement, substantially as set forth.

4. A reversing-trip consisting of a base-bracket having a horizontal face-groove planed therein, a pin set in the center of said groove and projecting outwardly, a horizontally-slotted slide fitted into said groove and having a vertical groove in its outer face, and a corresponding vertical slide-plate fitting said vertical groove and having on its inner surface an inclined groove operating upon the pin in the base-plate and on its outer face a horizontal groove to receive reciprocating dogs, combined and operated as set forth.

5. In a horizontal mortising-machine, the combination of a vertical column having a guide-face parallel with the plane of chisel-thrust, a vertically-adjustable supporting-plate held and guided thereon in a corresponding plane, a horizontally-reciprocable chisel-ram held and guided upon said plate, a reversing-trip upon the supporting-plate operated by the chisel-ram, a vertical shaft held adjacent to said plate in bearings upon the same, permitting the vertical movement of the plate in relation thereto, a crank-arm having a sliding engagement with said shaft, and connections between said crank and the reversing-trip, and connecting mechanism between said shaft and the reversible driving-gear for reciprocating the chisel-ram, substantially as set forth.

6. In a mortising-machine, the combination of a vertical column having a guide-face parallel with the plane of chisel-thrust, a vertically-adjustable supporting-plate held and guided thereon in a corresponding plane, a horizontally-reciprocable chisel-ram held and guided upon said plate, a reversing-trip upon the supporting-plate operated by the chisel-ram, a vertical shaft held adjacent to said plate in bearings upon the same, permitting the vertical movement of the plate in relation thereto, a crank-arm having a sliding engagement with said shaft, and connections between said crank and the reversing-trip, connecting mechanism between said shaft and the reversible driving-gear for reciprocating the chisel-ram, and a hand-crank connecting with said vertical shaft, substantially as set forth.

7. In a mortising-machine, the combination of the reciprocating tool-carriage, the driven counter-shaft, the oppositely-rotating loose pulleys thereon, the expansion friction-gears, the shifting cam-collar engaging the same alternately from an intermediate position of disengagement, the rock-shaft and connections with said collar, the intermediate crank on said rock-shaft, the hand-lever, and the pick-up cam actuated thereby for disengaging the collar, substantially as set forth.

8. In a mortising-machine, the combination of the reciprocating tool-carriage, the driven counter-shaft, the oppositely-rotating loose pulleys thereon, the expansion friction-gears, the shifting cam-collar engaging the same alternately from an intermediate position of disengagement, the rock-shaft and connections with said collar, the intermediate crank on said shaft, the hand-lever, the pick-up cam, and the brake operated by said lever simultaneously to arrest the momentum of the machine, substantially as set forth.

In testimony whereof we have hereunto set our hands in the presence of two subscribing witnesses.

GEORGE W. PASSEL.
JOHN SOFGE.

Witnesses:
L. M. HOSEA,
HENRY APPLETON.